(12) United States Patent
McCaskill

(10) Patent No.: US 12,379,046 B2
(45) Date of Patent: Aug. 5, 2025

(54) SERVICE TEE WITH VALVE PLUG FOR ISOLATION OF SIDE OUTLET

(71) Applicant: TDW Delaware, Inc., Wilmington, DE (US)

(72) Inventor: Daniel McCaskill, Tulsa, OK (US)

(73) Assignee: TDW Delaware, Inc., Wilmington, DE (US)

( * ) Notice: Subject to any disclaimer, the term of this patent is extended or adjusted under 35 U.S.C. 154(b) by 22 days.

(21) Appl. No.: 18/413,902

(22) Filed: Jan. 16, 2024

(65) Prior Publication Data

US 2024/0240729 A1   Jul. 18, 2024

Related U.S. Application Data

(60) Provisional application No. 63/480,029, filed on Jan. 16, 2023.

(51) Int. Cl.
*F16K 31/50*     (2006.01)

(52) U.S. Cl.
CPC ................................... *F16K 31/50* (2013.01)

(58) Field of Classification Search
CPC . F16K 1/50; F16K 3/243; F16K 3/246; F16K 31/508; F16K 27/02; F16K 27/041; F16K 27/006
See application file for complete search history.

(56) References Cited

U.S. PATENT DOCUMENTS 1,653,369 A * 12/1927 Murphy .................. F16K 3/243
                                                      251/324
1,805,106 A    5/1931 Robinson

FOREIGN PATENT DOCUMENTS

| BE | 517357 A | 2/1953 | |
|---|---|---|---|
| DE | 102009027106 A1 * | 1/2011 | ............. F16K 27/02 |
| EP | 2682651 A1 * | 1/2014 | ............... F16K 1/04 |
| GB | 150371 A | 9/1920 | |
| NL | 2011196 C2 * | 1/2015 | |
| RU | 2171410 C2 | 7/2001 | |
| RU | 2488031 C1 * | 7/2013 | ............. F16K 1/00 |
| WO | WO-9519518 A1 * | 7/1995 | ........... F16K 31/508 |
| WO | WO-0020145 A1 * | 4/2000 | ............... B21K 1/20 |

OTHER PUBLICATIONS

Machine English translation of RU_2488031_C1 (Year: 2025).*
Machine English translation of WO_9519518_A1 (Year: 2025).*
Machine English translation of DE_102009027106_A1 (Year: 2025).*
Machine English translation of NL_2011196_CZ (Year: 2025).*

* cited by examiner

*Primary Examiner* — Hailey K. Do
(74) *Attorney, Agent, or Firm* — GableGotwals

(57) ABSTRACT

A service tee (T) of this disclosure includes a valve plug (V) having a plunger (31) connected to a threaded stem (27) extending from a bottom end (10*b*) of a plug body (10). Turning the threaded stem actuates the plunger, thereby advancing and retracting a seal (35) of the plunger to block or allow flow respectively. An anti-rotation stop (23) prevents the plunger from rotating as the threaded stem linearly displaces the plunger. A keyway or drive (10*d*) for actuating the plunger remains recessed in the body of the plug so that prior art plug insertion tools can be used for plug installation. In some embodiments, the plug insertion tool may be a hot tapping machine. Once the plug has been set into a pressurized pipeline fitting, every leak path is sealed using non-metallic (e.g. elastomeric or polymer) sealing technology.

12 Claims, 2 Drawing Sheets

SERVICE TEE WITH VALVE PLUG FOR ISOLATION OF SIDE OUTLET

CROSS-REFERENCE TO CO-PENDING APPLICATIONS

This application claims priority to US 63/480,029 filed Jan. 16, 2023.

BACKGROUND

This disclosure is in the field of pipeline plugs and closures and, in particular, plugs designed to prevent flow through a side outlet of a tee. The tee may be used to make a main to service connection or to control service line flow at the main.

Prior art plugs include MUELLER® NO-BLO® H-17656 service stop tee and H-17800 curb stop tee. A stem and bushing arrangement extends and retracts a seal element that, when fully extended, resides in a seat located below the side outlet. As the stem rotates, so does the seal element.

SUMMARY

A valve plug of this disclosure may be used to prevent flow through a side outlet of a tee. Embodiments of the valve plug include a plunger connected to a threaded stem extending from a bottom end of the plug body. Turning the threaded stem actuates the plunger, thereby advancing and retracting a seal of the plunger to block or allow flow respectively.

Unlike the prior art, in embodiments of this disclosure a keyway for actuating the plunger remains recessed in the body of the plug so that prior art plug insertion tools can be used for plug installation. In some embodiments, the plug insertion tool may be a hot tapping machine. Once the plug has been set into the pressurized pipeline fitting, no metal-to-metal seal is used exclusively for maintaining a seal, but every leak path is sealed using elastomeric or polymer sealing technology.

The plunger does not rotate along a threaded surface during actuation, but translates linearly, allowing elastomers to be used for sealing between the plunger and the fitting wall without depending exclusively on a reduction in fitting bore for sealing. If an internal ledge is added to the fitting for a sealing seat, the translating plunger engages linearly into the seat rather than rotating into place. Linear translation helps mitigate seal wear and produces less seal wear than would rotational translation and, therefore, reduces the potential for leak paths to develop.

The valve plug may be adapted for use in pipelines operating in class locations 1 to 4, see 49 C.F.R. § 192.5, and operating in a range of 0 psig to at least 2220 psig (~ 15,306 kpa), for example, 200 psig to 1500 psig (~ 1378 kpa to ~10,342 kpa), there being sub-ranges within these broader ranges as well as discrete values. In some embodiments, the valve plug may be rated for 1440 psig maximum pressure, the rated pressure being below a maximum pressure that the plug can seal against. The valve plug may also be used in pipelines operating below 200 psig, for example, where operating pressure has been dropped (at least temporarily).

In some embodiments, the plug is a two-inch (50 mm) plug. In other embodiments, it is a one-inch (25 mm) plug. Embodiments may be created within this size range (e.g., 1.25 in, 1.5 in, etc.; 33 mm, 40 mm, etc.) as well as outside of this size range (e.g., 3 in, etc.; 80 mm etc.). The tee and plug may be provided as a single unit to the end user. The tee may include a seat or ledge for the bottom seal. A completion cap, such as but not limited to a T.D. Williamson, Inc. THREAD-O-RING™ cap, may then be connected to upper end of the tee. Standard commercial caps or customized caps may also be used, including caps that provide a drive such as a stem for receiving a plug insertion tool, the drive being connected to the threaded stem.

The structure of the plug allows for maintenance under pressure and dual dynamic sealing. An anti-rotation stop prevents the sealing plunger from rotating as it is extended and retracted by the threaded stem as well as when in use. The anti-rotation also prevents the plug from needing to retract upwards and therefore provides for a lower recessed profile. The recessed profile allows full access to the driving mechanism (such as but not limited to the square drive provided in this example). The unobstructed driving mechanism allows the plug to be set with existing tapping or pipe servicing machines, such as but not limited to T.D. Williamson tapping machines.

The dual dynamic sealing may be provided by any combination of elastomeric or polymer sealing technology such as, but not limited to O-rings, POLYPAK®s, backing rings. The seal or seals at the lower end of the plug may also be any combination of elastomeric or polymer sealing technology such as O-rings, POLYPAK® rings, backing rings, or equivalents thereof, that provide bi-directional sealing (flow through side outlet or up). A machined disc with grooves may be used to accommodate the seals at the lower end.

ELEMENTS USED IN THE DRAWINGS AND DESCRIPTION

Figure 1:
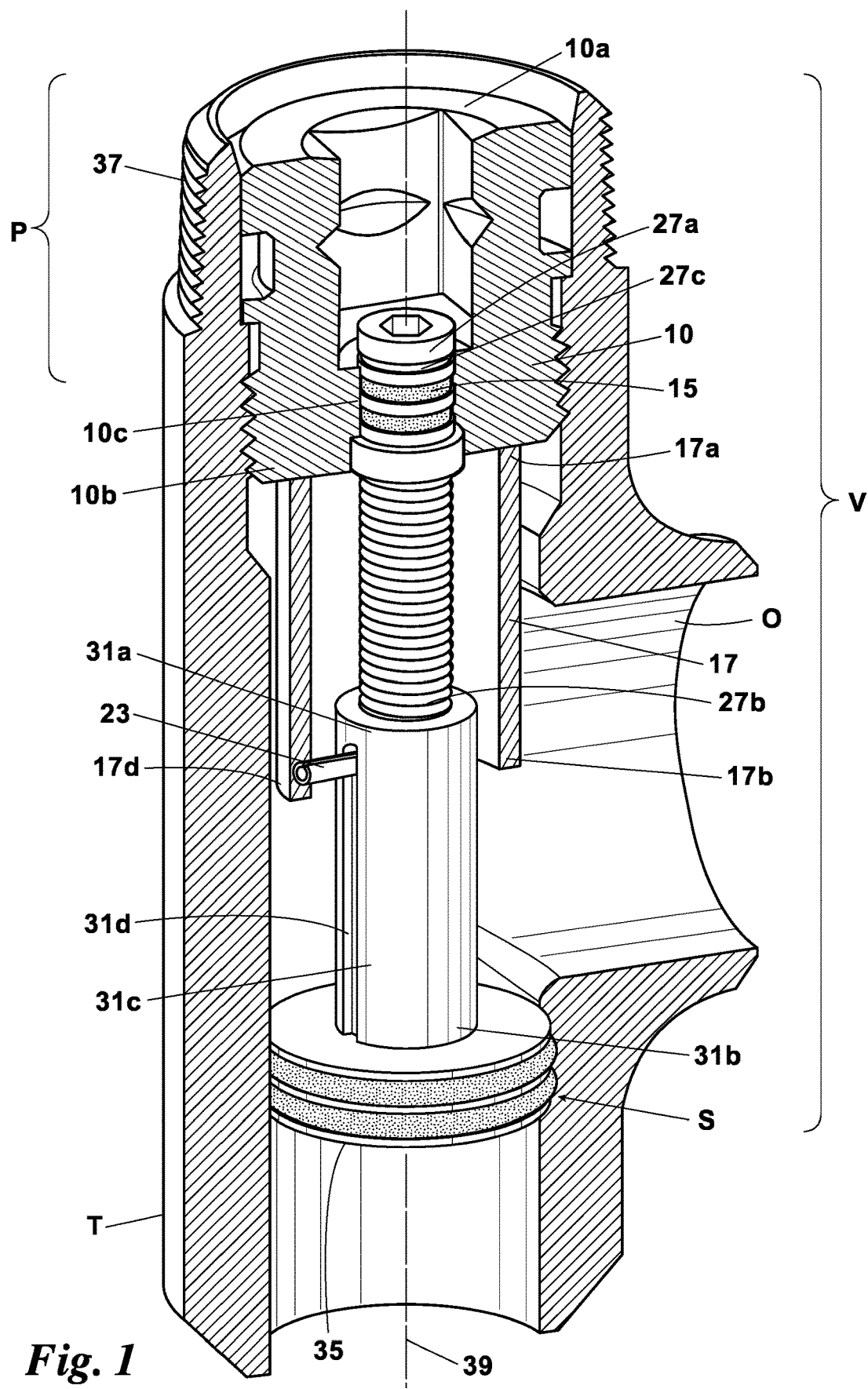
FIG. 1 is an isometric cross-section view of an embodiment of valve plug of this disclosure. The plug is shown with its plunger in an extended or advanced (sealing) position.

V Valve plug
Vu Uppermost end of valve plug
T Tee or fitting
S Seat (optional)
O Side outlet
P Plug
10 Plug body
10a Top end
10b Bottom end
10c Counter-bored hole or central opening
10d Drive or keyway
15 Elastomeric or polymer seal
17 Pipe or tube or guide
17a Upper end
17b Lower end
17c Sidewall
17d Hole
23 Anti-rotation stop or pin
27 Screw or threaded stem
27a Upper end screw body
27b Lower end
27c Lock washer
31 Plunger
31a Top end
31b Bottom end
31c Sidewall 31d Slot
35 Seal assembly
35a Elastomeric or polymer seal
37 Threads to receive completion cap
39 Longitudinal centerline or axis

DESCRIPTION

Figure 2:
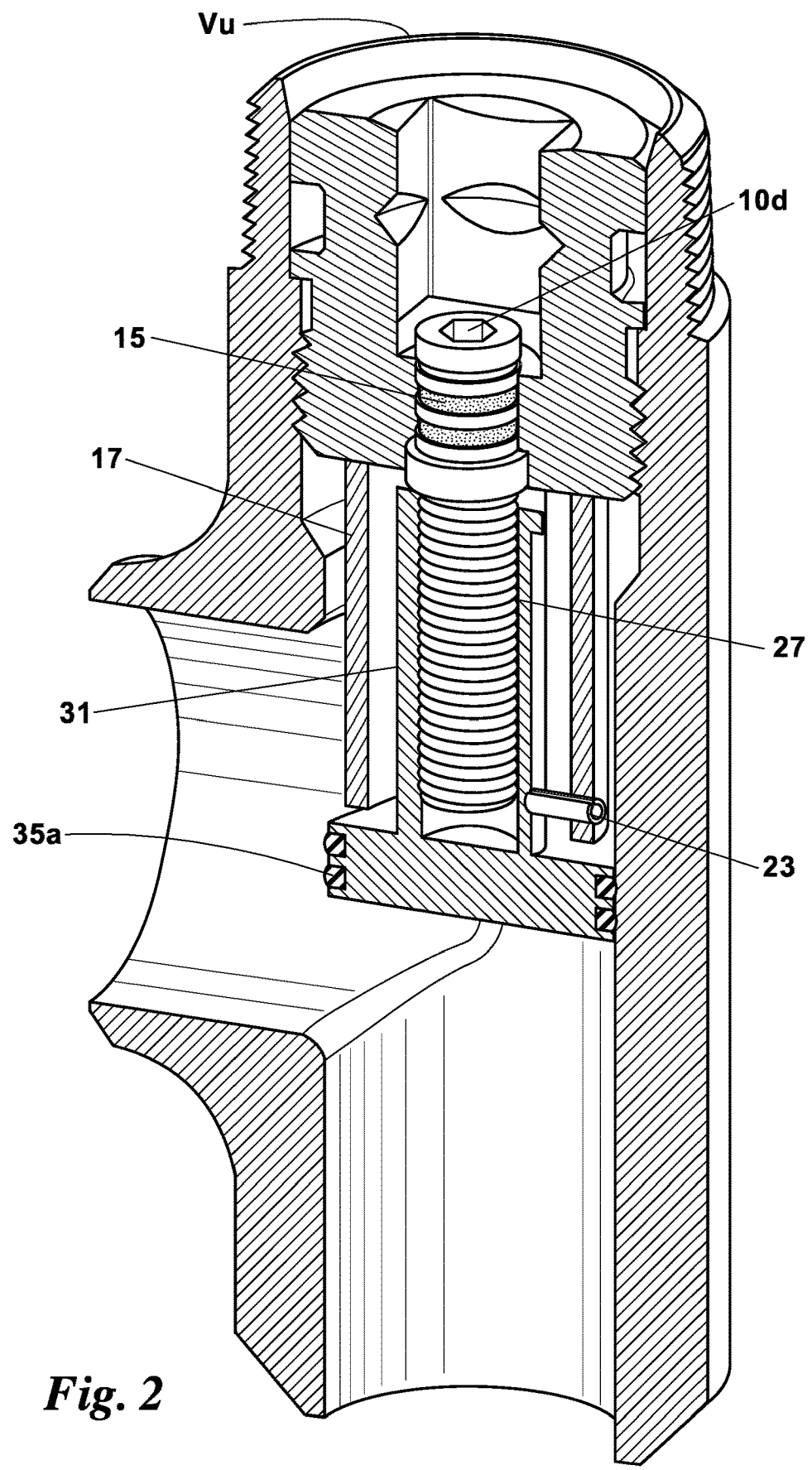
FIG. 2 is another isometric cross-section view showing a plunger of the valve plug in a partially retracted or partially advanced position.

Referring to FIGS. 1 and 2, in embodiments of this disclosure, the valve plug V includes a plug body 10 arranged coaxial a central longitudinal axis 39 of the valve plug V and having a bottom end 10b with a central opening 10c. A tube 17 is arranged coaxial to the central opening 10c and connected to the bottom end 10b of the plug body 10. The tube 17 has a larger diameter than the central opening 10c and includes a sidewall 17c with a through hole 17d.

The valve plug V further includes the a threaded stem or screw 27 having an upper end 27a partially contained by, extending from, the central opening 10c and a lower end 27b surrounded by the tube 17. In embodiments, the upper end 27a of the screw 27 includes a pair of elastomeric or polymer seals 15 spaced from one another and arranged about the upper end. The upper end 27a may include a non-threaded portion where the seals 15 are located. To rotate the screw 27 in a first and second direction opposite that of the first, a drive 10d is provided at a top end 10a of the plug body 10, the top end 10a being recessed relative to the uppermost end Vu of the valve plug V. The drive 10d may adapted to receive a predetermined insertional tool for plug installation.

The plunger 31 is connected to the lower end 27b of the screw 27. A top end 31a of the plunger 31 is surrounded by the tube 17. A bottom end 31b of the plunger 31 includes a seal assembly 35 that extends past a lower end 17b of the tube 17. The seal assembly 35 includes pair of elastomeric or polymer seals 35a spaced from one another and arranged about the bottom end 31b. The seals 35a may be a same or different elastomer or polymer than seals 15 of the screw 27. The plunger 31 also includes a sidewall 31c having a slot 31d that extends between the seal assembly 35 and a top end 31a of the plunger 31.

In embodiments, the valve plug V includes a plug body 10 having a top end 10a and a bottom end 10b; a tube 17 connected to the bottom end 10b of the plug body 10, the tube 17 including a sidewall wall 17c with a through hole 17d; a screw 27 at least partially contained by the tube 17 and having at least one seal 15 located toward an upper end 27a of the screw 27 and a drive 10d located at the upper end 27a of the screw 27; a plunger 31 connected to the screw 27 and having a seal assembly 35 extending past a bottom end 17b of the tube 17; the plunger 31 further including a sidewall 31c having a slot 31d extending between the seal assembly 35 and a top end 31a of the plunge 31; and an anti-rotation stop 23 received by the through hole 17d of the tube 17 and the slot 31d of the plunger 31. When the screw 27 is rotated in a first direction and in a second direction opposite the first direction, the plunger 31 does not rotate. When the screw 17 is rotated in the first direction and in the second direction, a linear distance between the seal assembly 35 and the lower end 17b of the tube 17 increases and decreases, respectively. The first direction may advance the screw 27 and therefore the plunger 31. The second direction may retract the screw 27 and therefore the plunger 31.

In some embodiments, the valve plug V comprises a plug body 10 having a top end 10a, the top end 10a recessed relative to an uppermost end Vu of the valve plug V, and a bottom end 10b, the bottom end 10b having a central opening 10c. A tube 17 is connected to the bottom end 10b of the plug body 10 and includes a sidewall 17c with a through hole 17d. A screw 27, having an upper end 27a that is partially contained by the central opening 10c, extends from the central opening 10c and has a lower end 27b surrounded by the tube 17. The upper end 27a of the screw 27 includes at least one seal 15. In embodiments, the seal 15 is non-metallic seal and may be a pair of seals 15 spaced apart from one another. A plunger 31 is connected to the lower end 27b of the screw 27. A top end 31a of the plunger is surrounded by the tube 17 and its bottom end 31b, which includes a seal assembly 35, extends past a lower end 17b of the tube 17. The seal assembly 35 includes at least one seal 35a. In embodiments, the seal 35a is a non-metallic seal. In some embodiments, the seal assembly 35 includes a pair of seals 35a spaced from one another. The plunger 31 further includes a sidewall 31c having a slot 31d extending between the seal assembly 35 and the top end 31a of the plunger 3. An anti-rotation stop 23 is received by the through hole 17d of the tube 17 and the slot 31d of the plunger 31. In embodiments, the screw 27 includes a drive 10d located at an upper end 27a of the screw 27, the drive 10d being recessed relative to a top end Vu of the valve body V.

In embodiments of a method of this disclosure for preventing fluid flow through a side outlet of a tee connected to a pipeline, the method includes inserting the valve plug (V) into the tee, the valve plug V including a screw 27 and a plunger 31 connected to a lower end 27b of the screw 27; inserting a plug setting tool into a drive 10d connected to the screw 27; using the plug setting tool to rotate the screw 27 in a first direction; during the rotating in the first direction, maintaining sealing engagement by way of a pair of seals 15 spaced apart from one another at an upper end 27a of the screw 27; advancing the plunger 31 into a sealing position, the plunger 31 including a seal assembly 35; and during the advancing, preventing the plunger 31 from rotating.

In embodiments of the method, the method may further include, after the sealing position, removing the plug setting tool and capping an uppermost end Vu of the valve plug V. The method may further comprise removing the capping; re-inserting the plug setting tool into the drive 10d located at the upper end 27a of the screw 27; using the plug setting tool to rotate the screw 27 in a second direction opposite that of the first direction; during the rotating in the second direction, maintaining the sealing engagement by way of the pair of seals 15; and retracting the plunger 37 into a non-sealing position; and during the retracting, preventing the plunger 31 from rotating.

What is claimed:

1. A tee (T) adapted for use with a pipe, the tee including a valve plug (V) comprising:
   a plug body (10) arranged coaxial a central longitudinal axis (39) of the valve plug, the plug body having a top end (10a) and a bottom end (10b), the bottom end having a central opening (10c), the top end being recessed relative to an uppermost end (Vu) of the valve plug;
   a tube (17) arranged coaxial to the central opening and connected to the bottom end of the plug body, the tube having a larger diameter than the central opening and including a sidewall (17c) with a through hole (17d);
   a threaded stem (27) having an upper end (27a) partially contained by, extending from, the central opening and a lower end (27b) surrounded by the tube, the upper end further including a pair of seals (15) spaced from one another;

a plunger (31) connected to the lower end of the threaded stem and having a top end (31a) surrounded by the tube, the plunger including a bottom end (31b) with a seal assembly (35) extending past a lower end (17b) of the tube, the seal assembly including a pair of seals (35a) spaced from one another, the plunger further including a sidewall (31c) having a slot (31d) extending between the seal assembly and the top end of the plunger;

an anti-rotation stop (23) received by the through hole of the tube and the slot of the plunger;

wherein, when the threaded stem is rotated in a first direction and in a second direction opposite the first direction, the plunger does not rotate; and wherein, when the threaded stem is rotated in the first direction and in the second direction, a linear distance between the seal assembly and the lower end of the tube increases and decreases, respectively.

2. The valve plug of claim 1, further comprising the threaded stem including a drive (10d) located at the upper end (27a) of the threaded stem.

3. A method for preventing fluid flow through a side outlet of a tee connected to a pipeline, the method comprising:

inserting a valve plug (V) into the tee, the valve plug including a threaded stem (27) and a plunger (31) connected to a lower end (27b) of the threaded stem;

inserting a plug setting tool into a drive (10d) connected to the threaded stem;

using the plug setting tool to rotate the threaded stem in a first direction;

during the rotating in the first direction,
maintaining sealing engagement by way of a pair of seals (15) spaced apart from one another at an upper end (27a) of the threaded stem; and
advancing the plunger into a sealing position, the plunger including a seal assembly (35); and during the advancing, preventing the plunger from rotating;

wherein:
the plug body is arranged coaxial a central longitudinal axis (39) of the valve plug, the plug body having a top end (10a) and a bottom end (10b), the bottom end having a central opening (10c), the top end being recessed relative to an uppermost end (Vu) of the valve plug;

a tube (17) is arranged coaxial to the central opening and connected to the bottom end of the plug body, the tube having a larger diameter than the central opening and including a sidewall (17c) with a through hole (17d);

an upper end (27a) of the threaded stem is partially contained by, extending from, the central opening, the lower end (27b) of the threaded stem is surrounded by the tube;

the plunger having a top end (31a) surrounded by the tube, the plunger including a bottom end (31b) with the seal assembly (35) extending past a lower end (17b) of the tube, the seal assembly including a pair of seals spaced from one another, the plunger further including a sidewall (31c) having a slot (31d) extending between the seal assembly and a top end (31a) of the plunger;

an anti-rotation stop (23) is received by the through hole of the tube and the slot of the plunger.

4. The method of claim 3, further comprising, after the sealing position:
removing the plug setting tool.

5. The method of claim 4, further comprising:
re-inserting the plug setting tool into the drive;

using the plug setting tool to rotate the threaded stem in a second direction opposite that of the first direction;

during the rotating in the second direction,
maintaining the sealing engagement by way of the pair of seals; and
retracting the plunger into a non-sealing position; and
during the retracting, preventing the plunger from rotating.

6. The method of claim 4, further comprising, after the sealing position:
capping the uppermost end (Vu) of the valve plug.

7. The method of claim 6, further comprising:
removing the capping;
re-inserting the plug setting tool into the drive located at the upper end of the threaded stem;
using the plug setting tool to rotate the threaded stem in a second direction opposite that of the first direction;
during the rotating in the second direction,
maintaining the sealing engagement by way of the pair of seals; and
retracting the plunger into a non-sealing position; and
during the retracting, preventing the plunger from rotating.

8. A tee adapted for use with a pipe and including a valve plug (V) comprising:

a plug body (10) including a bottom end having a central opening (10c);

a tube (17) arranged coaxial to the central opening and connected to the bottom end of the plug body, the tube including a sidewall (17c) with a through hole (17d);

a threaded stem (27) having an upper end (27a) partially contained by, extending from, the central opening and a lower end (27b) surrounded by the tube, the upper end further including a pair of seals (15) spaced from one another;

a plunger (31) connected to the lower end of the threaded stem and having a top end (31a) surrounded by the tube, the plunger including a bottom end (31b) with a seal assembly (35) extending past a lower end (17b) of the tube, the plunger further including a sidewall (31c) having a slot (31d) extending between the seal assembly and the top end of the plunger;

an anti-rotation stop (23) received by the through hole of the tube and the slot of the plunger;

wherein, when the threaded stem is rotated in a first direction and in a second direction opposite the first direction, the plunger moves in a linear direction and does not rotate.

9. The valve plug of claim 8, further comprising the plug body having a top end (10a) and the bottom end (10b), the bottom end having the central opening (10c), the top end being recessed relative to an uppermost end (Vu) of the valve plug.

10. The valve plug of claim 8, wherein when the threaded stem is rotated in the first direction and in the second direction, a linear distance between the seal assembly and the lower end of the tube increases and decreases, respectively.

11. The valve plug of claim 8, further comprising the threaded stem including a drive (10d) located at the upper end (27a) of the threaded stem.

12. A tee adapted for use with a pipe and including a valve plug (V) comprising:
a plug body (10) having a top end (10a) and a bottom end (10b);

a tube (17) connected to the bottom end of the plug body, the tube including a sidewall wall (17*c*) with a through hole (17*d*);

a threaded stem (27) at least partially contained by the tube and having at least one seal (15) located toward an upper end (27*a*) of the threaded stem and a drive (10*d*) located at the upper end of the threaded stem, the drive recessed relative to the top end of the plug body;

a plunger (31) connected to the threaded stem and having a seal assembly (35) extending past a bottom end (17*b*) of the tube; the plunger further including a sidewall (31*c*) having a slot (31*d*) extending between the seal assembly and a top end (31*a*) of the plunger; and an anti-rotation stop (23) received by the through hole of the tube and the slot of the plunger.

* * * * *